United States Patent [19]
Scott

[11] Patent Number: 4,795,135
[45] Date of Patent: Jan. 3, 1989

[54] POWER DRIVEN TRAILED SKIDDER VEHICLE

[76] Inventor: Francis G. Scott, Mountain View Dr., R.R. 1, Box 2040, Woodland, Me. 04694

[21] Appl. No.: 887,026

[22] Filed: Jul. 17, 1986

[51] Int. Cl.$^4$ .............................................. B66C 23/36
[52] U.S. Cl. .................................. 254/327; 254/328; 180/14.4; 414/569; 414/739
[58] Field of Search ............... 414/729, 731, 738, 739, 414/741, 569, 703; 180/14.4, 14.3, 14.7; 254/323, 324, 325, 327, 328

[56] References Cited

U.S. PATENT DOCUMENTS

| | | |
|---|---|---|
| 721,705 | 4/1903 | Hunt . |
| 1,045,992 | 6/1912 | Linn . |
| 1,530,921 | 3/1925 | Winesburg ........................ 254/323 |
| 2,903,080 | 9/1959 | Ritter ................................ 180/14.4 |
| 2,959,236 | 11/1960 | Boggess . |
| 3,299,980 | 3/1967 | Haefner . |
| 3,442,345 | 8/1969 | Berger . |
| 3,473,619 | 2/1969 | Dion . |
| 3,860,282 | 1/1975 | Johnson ............................ 414/739 |
| 4,069,885 | 4/1978 | Gego et al. . |
| 4,071,105 | 1/1978 | von Allwörden ................. 180/14.4 |
| 4,139,073 | 2/1979 | Curtis ................................ 180/14.4 |
| 4,436,475 | 3/1984 | Blagg ................................. 414/569 |

FOREIGN PATENT DOCUMENTS 2263117 10/1973 Fed. Rep. of Germany ...... 414/738

Primary Examiner—Stuart S. Levy
Assistant Examiner—Katherine Matecki
Attorney, Agent, or Firm—Daniel H. Kane, Jr.

[57] ABSTRACT

A trailed skidder vehicle driven from the power take-off of a tractor or other power driving vehicle performs the operations of a conventional skidder. The trailed skidder vehicle has an elongate structural frame supported by an axle and set of wheels at the rear end of the frame. The axle includes a differential drive for coordinated drive of the set of wheels. A load bearing superstructure arch-like support extends above the frame adjacent to the rear end. The arch support is constructed with braces on the frame for transmitting forces from a load applied at the top of the arch support to the axles. A superstructure cable bearing such as a cable roller arrangement or fairlead is mounted on the arch support for guiding and bearing a timber skidding cable. A winch is mounted on the frame forward of the superstructure arch support for extending and retracting a timber skidding cable over the cable bearing or roller arrangement. A number of structural features are incorporated for power driven operation in coordination with a tractor or other power driving vehicle. In an alternative embodiment a boom or grapple boom is pivotally mounted on the superstructure arch support with a grapple or jaw mounted at the free end of the boom for grapple skidding down timber. Grapple skidding capability may be combined with cable skidder ability on the trailed skidder vehicle with the cable bearing fairlead rollers mounted below the grapple boom on the arch support.

18 Claims, 8 Drawing Sheets

POWER DRIVEN TRAILED SKIDDER VEHICLE

FIELD OF THE INVENTION

This invention relates to a new wood skidder machine for skidding, dragging, towing, twitching, cable winching, and grappling down timber from the woods. In particular the invention provides a new trailed skidder vehicle operating from the power take-off of a farm tractor or other power driving vehicle for performing the functions of either a conventional cable skidder, a conventional grapple skidder or a novel interacting combination of both.

BACKGROUND ART

Conventional skidders or skidder machines are large articulated heavy duty tractor vehicles for pulling, lugging, dragging, lifting or otherwise removing down timber from the woods. Such skidders are characterized by their large size, heavy weight, large tractor tires, and maneuverability and are of two basic types.

The cable skidder is a large tractor vehicle which incorporates a winch and a timber skidding cable that rides over fairlead rollers mounted on an arch for cable skidding, dragging, pulling, or hauling down timber by cable winching. Multiple chokers are mounted on the end of the skidder cable, generally one for each tree or trunk to be hauled at once. The chokers are relatively shorter lengths of cable chokers or chain chokers for cinching around the end of a tree or trunk and are coupled to sliders or slider collars that slide on the main skidder cable. For example up to 10 chokers may be mounted on the end of the skidder cable for dragging and hauling multiple trees or trunks. After cable winching and dragging timbers to the skidder, the butt ends of the timbers are lifted on the cable for hauling by the skidder.

A grapple skidder is a large tractor vehicle on which a boom is mounted at one end on a pivotal mounting for pivotal motion of the boom upward and downward. A grapple or large jaw is mounted at the free end of the boom for lifting the end of a tree or trunk for towing, skidding, and hauling the down timber from the woods. The grapple jaw may be large enough when open, for example, 4 feet (1.2 m) in width at the mouth to accommodate multiple trees or trunks for grapple skidding.

A disadvantage of the conventional skidder tractors whether cable skidders or grapple skidders is the large size and heavy weight, for example typically 10 tons for even the lighter weight skidders. The heavy weight, large size, and large tractor tires result in substantial disruption of and damage to the forest floor, soil and undergrowth. The traditional skidders are notorious for the soil erosion problems and disruption resulting from skidder operations.

Another disadvantage of even the smallest available skidder machines is the substantial cost in the order of at least $75,000 to $80,000 in the lower price range. This places a heavy financial burden on the small woods operators and independent contractors. A major portion of the woods harvesting and skidding is contracted out by the paper companies and timber companies to the small woods operators and independent contractors. The heavy financial burdens result in equally heavy operation of the skidder machines in order to meet financing payment obligations. The conventional skidder machines are furthermore out of reach of the small wood lot owners who either cannot justify the cost or refuse to permit the disruption and damage associated with conventional skidder machine operation.

A variety of power wagons or power trailer wagons are described in prior art patents. For example the Dion U.S. Pat. No. 3,473,619 describes a drive unit such as a track vehicle and a power driven wagon for transporting logs with a drive coupling between the track vehicle and power driven wagon. The internal combustion engine 14 is located in the drive vehicle or track vehicle and the drive train power coupling includes separate differential units 38 and 40 in the drive vehicle and driven vehicle with three 5 universal joints 41, 42 and 43 located in between to permit universal motion of the driven wagon relative to the driving track vehicle.

Another positively driven trailer wagon is illustrated in the Berger U.S. Pat. No. 3,442,345. As in the Dion patent, differentials 20 and 22 are included in both the forward cab of the drive vehicle and the following trailer portion. The drive shaft connects the forward and rear differentials with universal joints at each end.

The Boggess U.S. Pat. No. 2,959,236 provides a more detailed description of a universal trailer drive train including a universal swivel gear unit, universal joints, and telescoping drive shafts. The Ritter U.S. Pat. No. 2,903,080 describes a power driven or positively driven trailer wagon with detailed description of a complex differential drive means.

A number of other arrangements are described for power take-off positive drive for trailing wagons and vehicles including the more recent Gego et al. U.S. Pat. No. 4,069,885 and the early Hunt U.S. Pat. No. 721,705.

While the concept of a positively driven power trailer wagon for a variety of applications is old, no one has used the tractor power take-off for a trailed skidder vehicle providing a light weight equivalent of a skidder or skidding machine for cable winching, grappling, skidding and hauling tree length timbers. The novel structural features required for timber hauling skidder functions and applications on a trail vehicle are not disclosed in the references. Nor is it apparent how a trailed or trailing vehicle may be particularly adapted for such timber skidding and hauling functions and applications.

OBJECTS OF THE INVENTION

It is therefore an object of the present invention to provide a new skidder vehicle capable of performing the functions of traditional skidder machines but weighing for example 1/5 the weight of even the lightest conventional skidder vehicles and at, for example ¼ the initial capital cost.

Another object of the invention is to provide a light weight inexpensive trailed or trailing skidder vehicle which may be operated by a traditional farm tractor as another attachment to the tractor. The invention therefore intends to provide skidder capability to the farmer and small wood lot owner.

Another object of the invention is to provide a trailed or trailing skidder vehicle powered by a farm type tractor or similar power driving vehicle which can operate as either a cable skidder or a grapple skidder or a novel interacting combination of both with its own independent drive powered by the farm type tractor or other power driving vehicle.

A further object of the invention is to provide a light weight maneuverable skidder vehicle capable of accessing difficult locations in the woods for skidding and twitching down timber, trees and trunks with minimum damage to the soil and undergrowth.

DISCLOSURE OF THE INVENTION

In order to accomplish these results the present invention provides a trailed or trailing skidder vehicle having an elongate structural frame such as an "I" beam, channel iron, or tubular frame and an axle supporting the frame at a location adjacent to the rear end of the frame. A set of wheels is distributed on the axle on either side of the frame for transport of the frame over the ground surface. The axle also includes a differential drive for coordinated drive of the set of wheels. The axle support may include either a single axle or a double axle for supporting the frame at the rear end location.

According to the invention a load bearing superstructure such as an arch-like steel structure or support extends above the frame adjacent to the rear end. The superstructure arch support is constructed and arranged with braces on the frame for transmitting forces from a load applied on the superstructure arch support substantially to the axles. A superstructure cable bearing arrangement such as a pulley on a universal swivel or coupling but preferably a cable roller arrangement or fairlead is mounted on the superstructure arch support for guiding and bearing a skidder cable. For winch cable skidder operation a winch is mounted on the frame forward of the superstructure arch support for extending and retracting a timber skidding cable over the superstructure cable bearing or fairlead roller arrangement.

The invention contemplates a number of structural features for power driven operation in coordination with a tractor or other power driving vehicle. A trail hitch is formed at the front end of the frame for coupling to a power driving vehicle. A first drive coupling is mounted at the front end of the frame in parallel with the trail hitch for coupling to a first power take off on the power driving vehicle such as for example the power takeoff on a farm tractor. The first drive coupling includes a first universal joint, first drive shaft and second universal joint in sequence. A trailed skidder vehicle transmission is mounted on the frame and the first drive coupling is operatively coupled to the trailed skidder vehicle transmission. A second drive coupling is operatively coupled between a second power take off on the trailed skidder vehicle transmission and the winch. A third drive coupling is also operatively coupled between the transmission and the differential on the axle supporting the trailed skidder vehicle frame for independent drive by the axle and wheels of the skidder vehicle.

A feature and advantage of the trail hitch and multiple drive coupling arrangements is that the trailed skidder vehicle wheels are power driven by the power driving vehicle for independent traction and drive by the trailed skidder vehicle. Moreover, the winch is power driven by the power driving vehicle for skidding or dragging down timber by winching the timber skidding cable over the cable bearing or fairlead on the superstructure arch support. Furthermore, timber or trunk butt ends may be winched up above the ground from the superstructure arch support for towing or pulling timber and for bearing the load on the trailed skidder vehicle rather than on the power driving vehicle, typically for example a tractor.

According to the cable skidder trailed vehicle invention the top of the superstructure arch support extends above the frame and beyond the axle in the direction of the rear end of the frame. The cable bearing is mounted near the top of the arch support and is also positioned beyond the axle in the direction of the rear end of the frame. A feature and advantage of this arrangement is that bull ends of lengths of down timber skidded, twitched, or dragged in by the winch on a timber skidding cable do not abut against or slide under the axle. The invention also contemplates mounting substantially vertical butt plates secured at the rear end of the frame to stop the butt ends of timber skidded or dragged in by the winch and cable from going under the frame. For the cable winching skidder embodiment of the invention, the cable bearing is mounted adjacent to the top of the superstructural arch support and in the preferred embodiment comprises at least one roller and preferably a set of cable bearing rollers including a first horizontal cable bearing roller mounted near the top of the superstructure arch support, and first and second vertically oriented cable bearing rollers mounted on either side of the horizontal roller. The roller arrangement is referred to as a "fairlead" or as fairlead rollers. By this expedient the timber skidding cable is maintained within a desired location near the top of the arch support despite lateral forces on the cable. Alternatively, a pulley mounted on a universal swivel or coupling may be used for bearing the cable.

The invention contemplates a number of novel features for drive coupling arrangements appropriate to skidding operations and functions by the trailed skidder vehicle. The first drive shaft of the first drive coupling is provided with a first slip joint for longitudinal extension and retraction of the first drive shaft thereby avoiding compressional loads and impacts on the first and second universal joints during relative motion between the powering driving vehicle and the trailed skidder vehicle. The parallel trailer hitch is constructed with a roll-over or rotational coupling around a longitudinal axis along the direction of the frame for accommodating rotational or twisting motion of the trailed skidder vehicle relative to the power driving vehicle.

The third drive coupling includes a third universal joint, second drive shaft and fourth universal joint in sequence. It is also constructed with a slip joint for telescoping extension and retraction of the second drive shaft in the longitudinal direction to accommodate slight flexing motion of the elongate frame of the trailed skidder vehicle under the stresses of skidding and twitching.

The skidder winch comprises a clutch and brake for three operative modes of the winch, a winch drive mode for winching in a timber skidder cable, a locking mode for locking the position of the winch, and a free spool mode for manually pulling the cable from the winch. The trailed skidder vehicle transmission includes at least one drive speed for independent power drive of the third drive coupling and the axle differential and set of wheels of the trailed skidder vehicle: and a neutral or idle mode for operation of the transmission second power take-off and second drive coupling and winch. A feature and advantage of these arrangements is that the winch and transmission of the trailed skidder vehicle may be coordinated with the first power take-off of a power driving vehicle for operation of the winch for skidding, dragging or hauling down timber when the trailed skidder vehicle transmission is in neutral or idle.

On the other hand the transmission may be coordinated with the first power take-off of a power driving vehicle for independently driving the trailed skidder vehicle axle and set of wheels when the trailed skidder vehicle transmission is in a forward drive speed and the winch is, for example, in the locking mode.

According to another embodiment, the invention provides for grapple skidder operation by the trailed skidder vehicle. A boom or grapple boom is mounted with one end of the boom on a pivotal shaft mounting on the superstructure arch support above the cable bearing rollers or cable fairlead for pivotal motion of the boom upward and downward. A grapple, jaw or cherry picker is mounted at the free end of the boom for grapple skidding down timber. The grapple jaw may be opened to a width sufficient for example to accommodate multiple trees or trunks for lifting, hauling and grapple skidding the down timber. The grapple boom and jaws are operated by hydraulic cylinders and hydraulic valve controls with quick-connect hydraulic couplings which may be coupled, for example, to the auxiliary hydraulic system of a farm-type tractor or other power driving vehicle.

A feature and advantage of this embodiment of the invention is that grapple skidding capability may be combined with cable skidder capability on the trailed skidder vehicle. To this end, the grapple boom is pivotally mounted on the arch support above the cable bearing or cable bearing rollers. The timber skidding cable from the winch therefore passes over the fairlead rollers below the grapple boom and either mode or a combination of modes may be selected for skidding according to the circumstances. For example, timbers may be cable winched and dragged to the vehicle from a difficult location and then grapple lifted at the ends for lugging or hauling by the vehicle.

The invention provides a variety of operator controls along the side of the frame at a location where the wheels and tires of the trailed skidder vehicle shield an operator from the cable skidding timbers approaching the vehicle or the grapple skidding timbers being lifted. Thus, the winch controls for cable skidding, the hydraulic controls for grapple skidding, the transmission gear shift and power takeoff controls may all be positioned at a common location along the side of the frame where a standing operator may control all operations of the trailed or trailing skidder vehicle. The present invention may also provide a trailed or trailing skidder vehicle for grapple skidding only in addition to the combined embodiment capable of both cable skidder and grapple skidder operation. The trailed or trailing skidder vehicle may incorporate a number of additional features including for example the addition of hydraulic dog legs at the back sides of the frame to drive into the ground, further stabilizing the trailed skidder vehicle during cable winching and skidding of timbers to the vehicle.

Other objects, features and advantages of the invention are apparent in the following specification and accompanying drawings.

DESCRIPTION OF PREFERRED EXAMPLE EMBODIMENTS AND BEST MODE OF THE INVENTION

Figure 1:
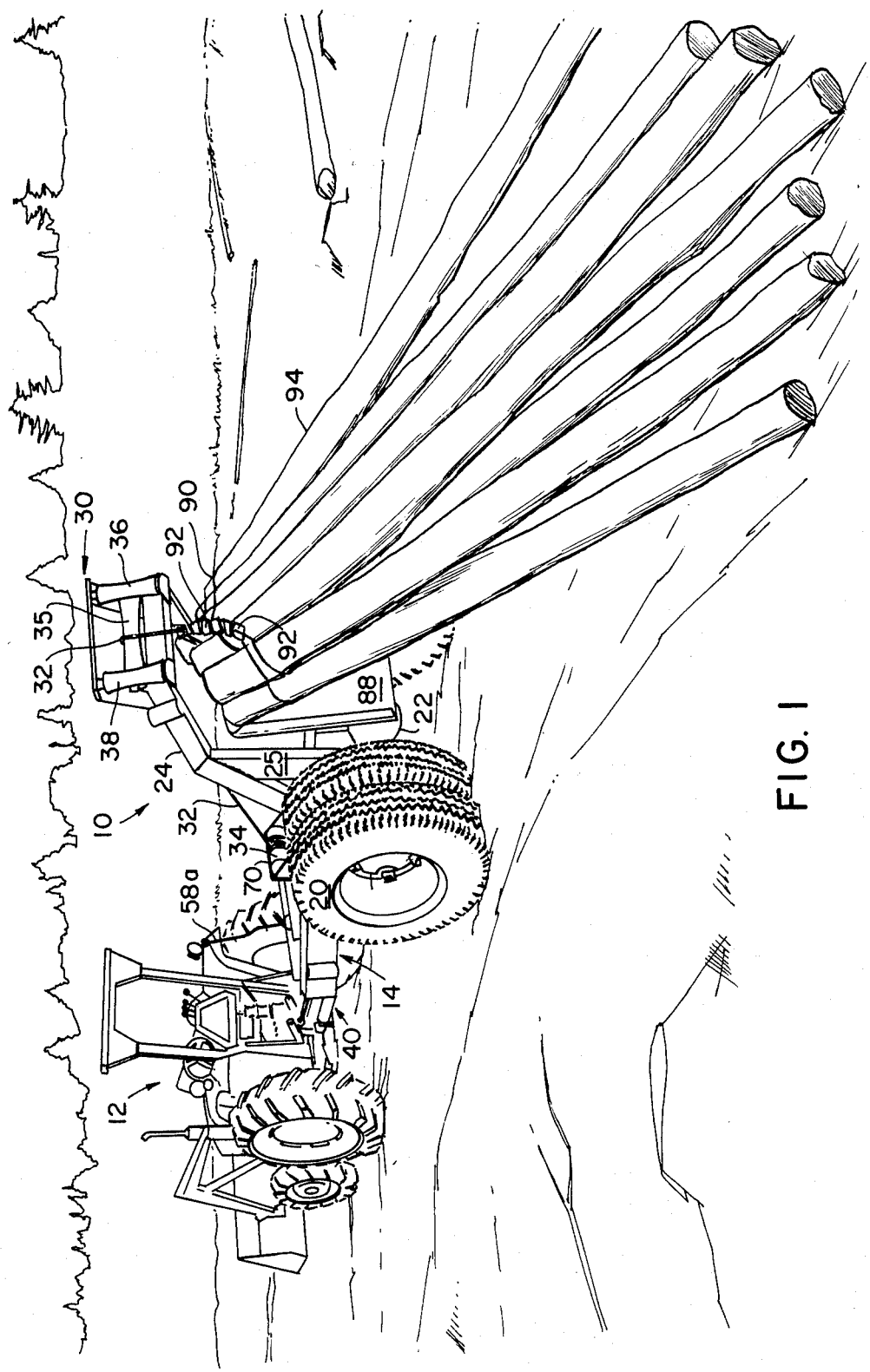
FIG. 1 is a perspective view from the rear of the cable skidding or cable winching embodiment of the trailed or trailing skidder vehicle according to the invention coupled to a farm type tractor as the power driving vehicle.
Figure 2:
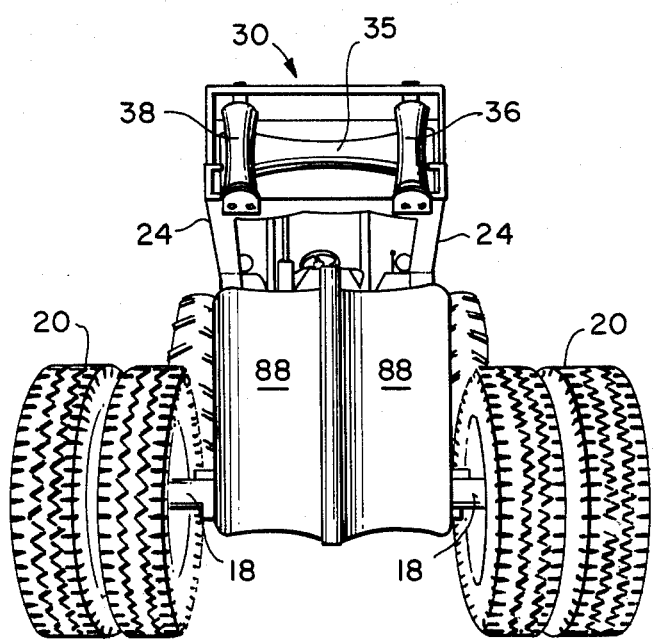
FIG. 2 is a rear elevation view of the cable skidding or cable winching trailed skidder vehicle of FIG. 1.

A power driven trailed skidder vehicle 10 for cable skidding according to the invention is illustrated in FIGS. 1 through 6. The power driven trailed skidder vehicle 10 is coupled to a farm-type tractor 12 for the power driving vehicle as illustrated in FIG. 1. As shown in FIG. 1, the farm tractor 12 provides a power driving vehicle with a four point stable wheel base for independent self-support. The trailed skidder vehicle 10 is constructed with an elongated frame 14, for example a pair of elongate spaced apart channel iron beams 15a and 15b joined by cross braces 16a through 16f. The elongate beams 15a and 15b of the frame or chassis 14 may be constructed, for example of 10–12 inch (25.4–30.5 cm) channel steel. The elongate frame is supported by an axle 18 at a location adjacent to the rear end of the frame or chassis 14. Sets of double wheels 20 such as large twelve-ply tires or flotation tires are distributed on the axle 18 on either side of the frame 14 for transport of the frame over rough terrain. The axle 18 includes a differential drive 22 for coordinated drive of the sets of wheels 20. Industrial chains, studded chains and ring lug chains may be used on the tires to increase traction.

A load bearing superstructure 24 referred to as an arch, arch like structure or arch support is mounted on the frame 14 and extends above the frame at the rear end. The arch 24 is constructed with braces 25 on the frame for transmitting forces from a load on the arch to the axles 18. A skidder cable bearing arrangement in the form of a fair-lead 30 is mounted near the top of the arch 24 for guiding and bearing the load of the skidder cable 32. A winch 34 is mounted on the frame 14 forward of the superstructure arch 24 for extending and retracting the timber skidding cable 32 over the fair-lead rollers.

The cable bearing arrangement referred to as the fair-lead 30 is constructed with a horizontal cable bearing roller 35 and a pair of generally vertically oriented cable bearing rollers 36 and 38 mounted on either side of the horizontal roller 35. The rollers 35, 36 and 38 are dished for guiding and centering the cable 32.

Figure 4:
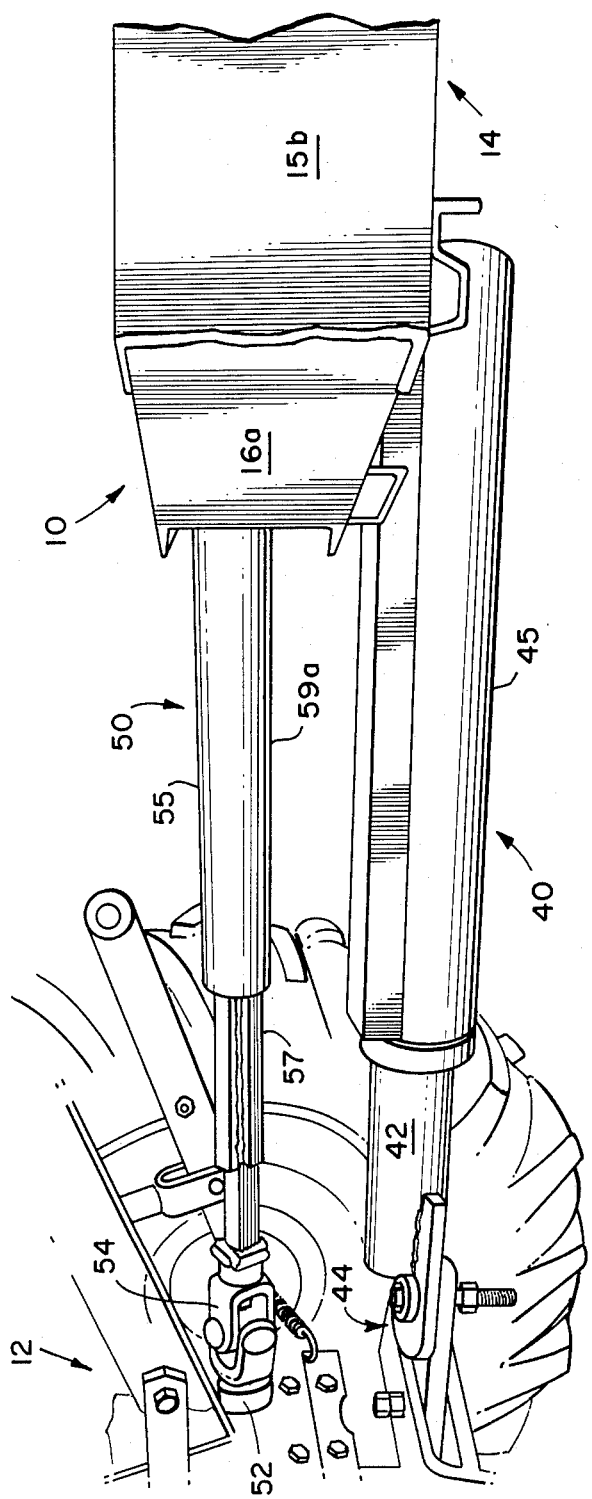
FIG. 4 is a detailed fragmentary side perspective view of the parallel trail hitch and first power take-off coupling between the trailed skidder vehicle and power driving tractor.

The power train of the trailed power driven skidder vehicle 10 for power driven operation in coordination with a tractor 12 or other power driving vehicle is illustrated in FIGS. 4, 5A, 5B and FIG. 6. Referring to FIG. 4, a trail hitch 40 is fixed at the front end of the frame 14, for example at the front cross brace 16a for coupling to the tractor 12. The trailer hitch 40 is constructed with a roll-over rotational coupling around a longitudinal axis along the direction of the frame or chassis 14 for accommodating rotational or twisting motion of the trailed skidder vehicle 10 relative to the tractor 12. The rotational coupling of the trailer hitch 40 is formed by a circular cross section trailer hitch bar 42 coupled to the trailer hitch of tractor 12 by trailer coupling 44 and a circular cross section sleeve 45 coaxial with the circular cross section trail hitch bar 42. The coaxial sleeve 45 is fixed to the frame or chassis 14.

Figure 5A:
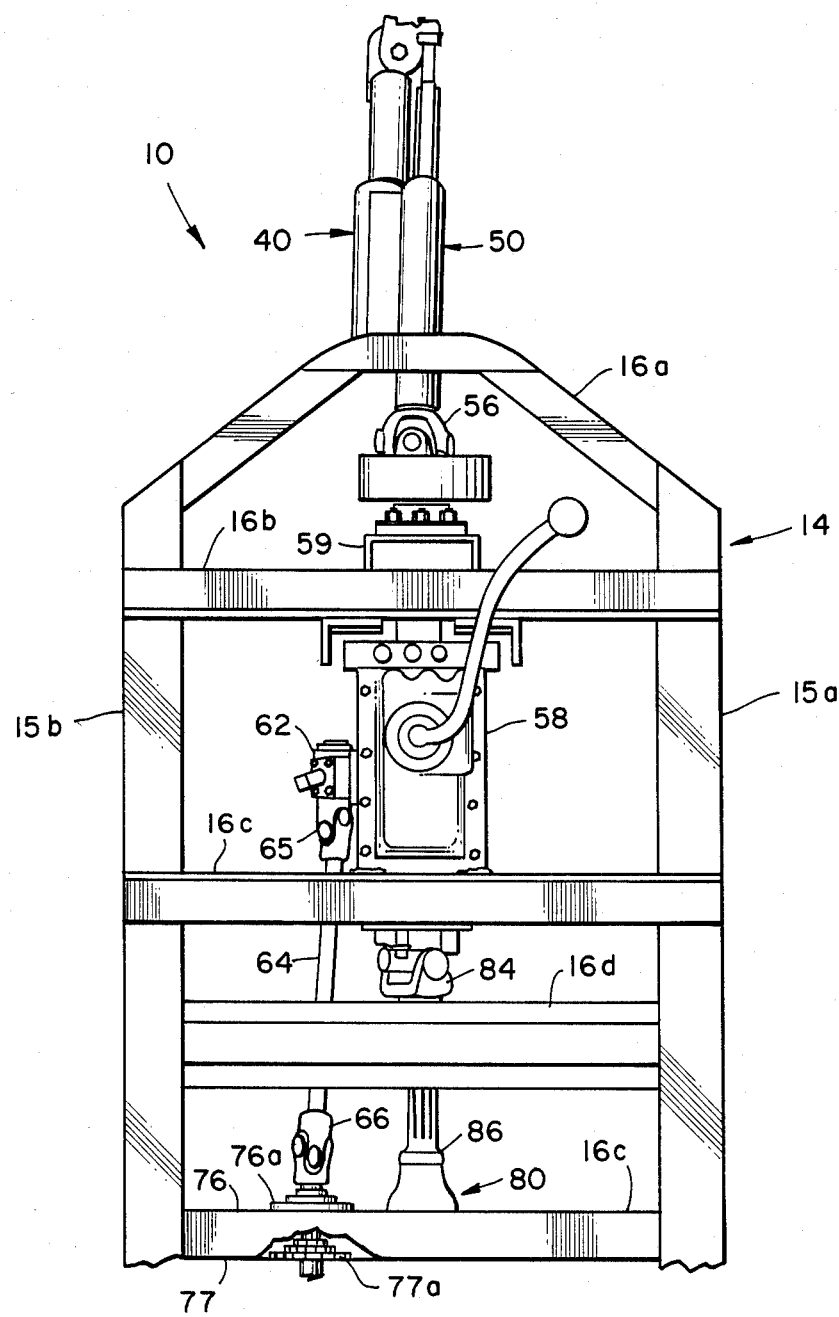
FIGS. 5A and 5B are detailed fragmentary plan views from above of the trailed skidder vehicle showing the power drive train and multiple drive couplings from the front to the rear end of the trailed skidder vehicle.

The power take-off drive shaft 50 also referred to as the first drive coupling is mounted at the front end of the frame 14 in parallel with the trail hitch 40 for coupling to the power take-off 52 of the tractor 12, also referred to as the first power take-off. The first drive coupling 50 includes a first universal joint 54, first drive shaft 55 and second universal joint 56 as shown in FIGS. 4 and 5A. The trailed skidder vehicle 10 is provided with a transmission 58 secured to the cross braces of the frame 14. The first drive coupling 50 is operatively coupled between the power take-off of tractor 12 and the trailed skidder vehicle transmission 58 through the flange mount bearing 59 on cross brace 16b of frame 14 which constrains coupling forces in the radial direction.

Figure 5B:
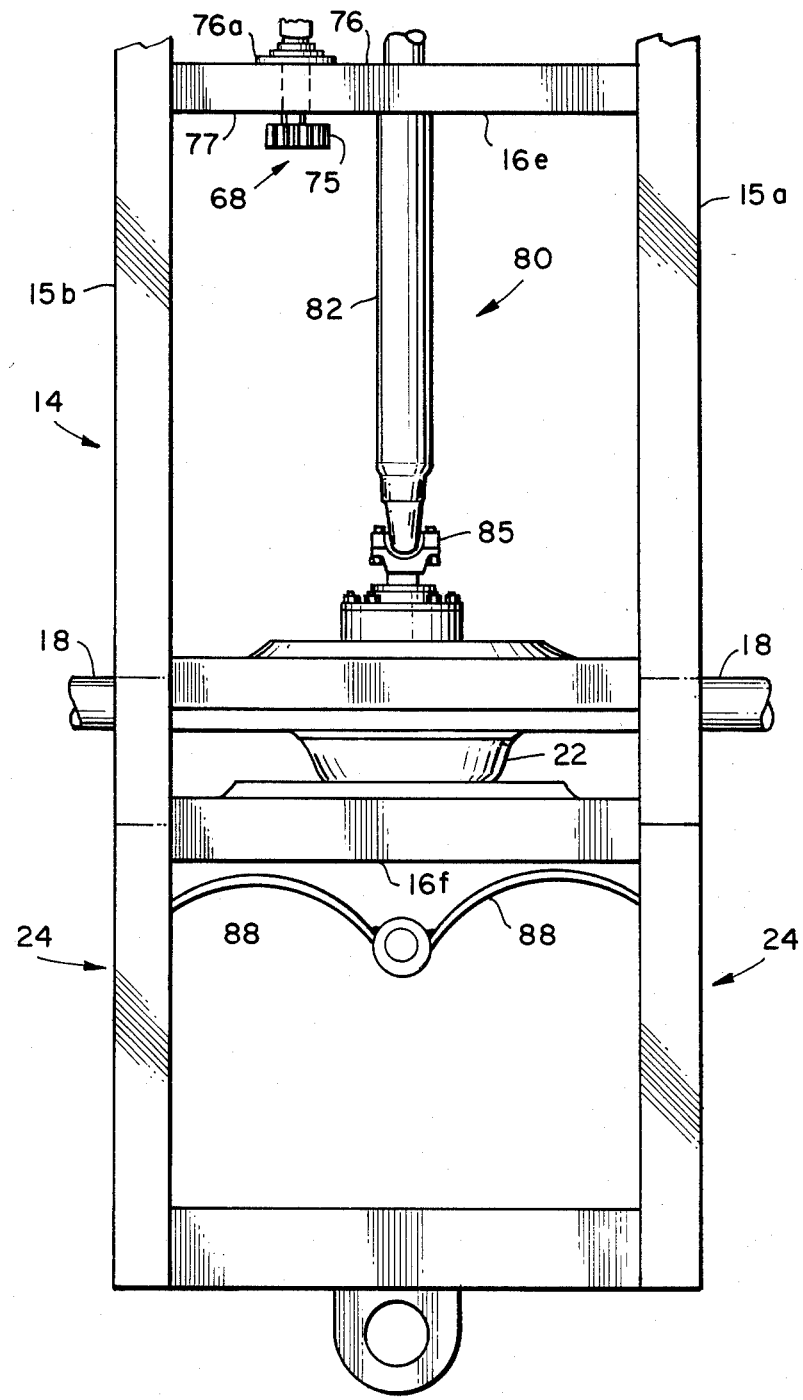

A second drive coupling 60 is operatively coupled between a second power take-off 62 on the trailed skidder vehicle transmission 58 and the winch 34 mounted on the frame 14 forward of the arch 24 but not shown for simplicity in FIGS. 5A and 5B. The second drive coupling 60 is provided by a drive shaft 64 with universal joints 65 and 66 at either end coupled between the transmission power take-off 62, also referred to as the second power takeoff, and a sprocket drive 68 on the winch 34.

Figure 6:
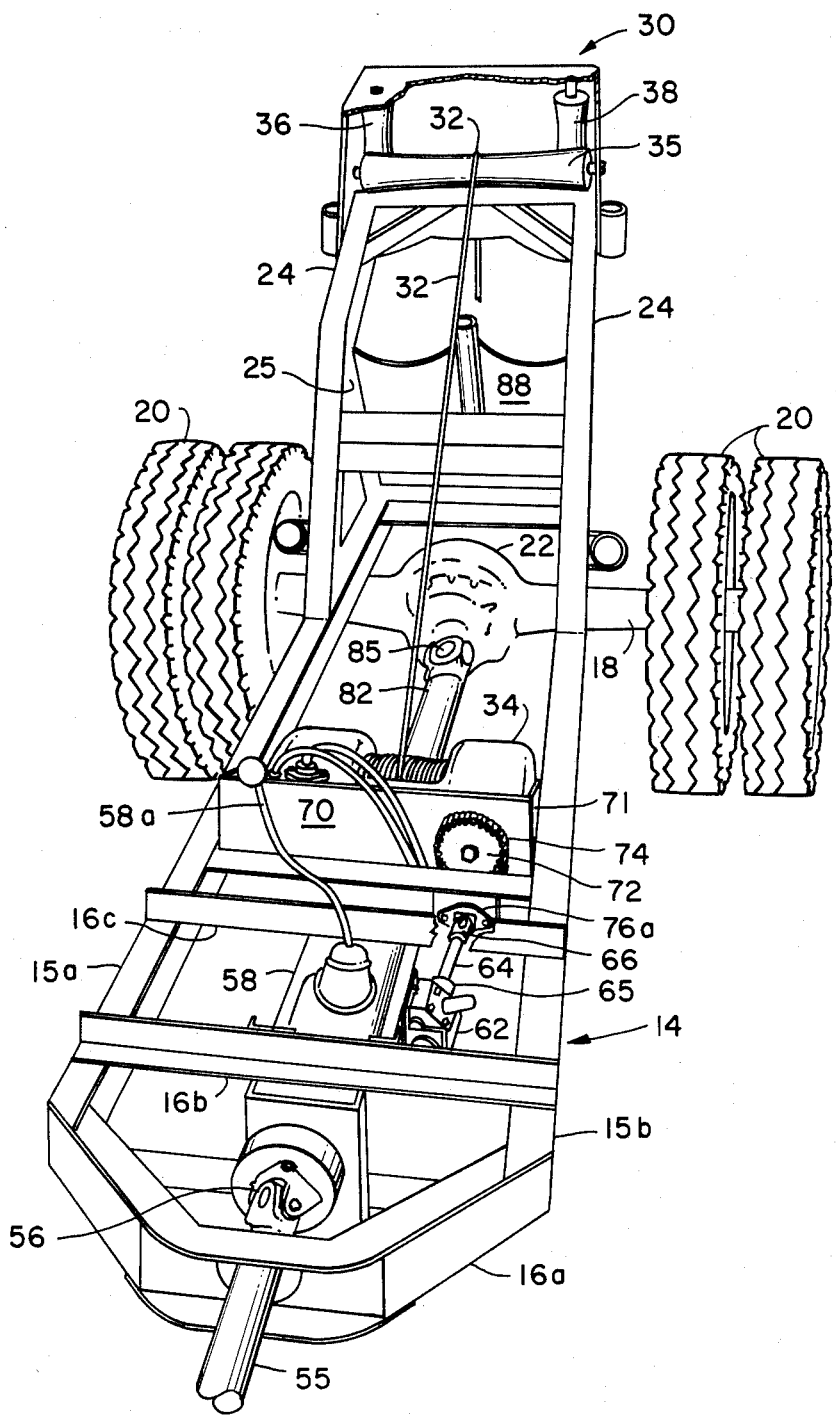
FIG. 6 is a detailed perspective view from the front of the trailed skidder vehicle showing the location and operation of the timber skidding cable winch on the trailed skidder vehicle for cable skidding operation.

The winch 34, as shown in FIG. 6, is mounted on a solid vertical mounting plate 70 welded to the frame with triangular reinforcements 71. The driven sprocket 72 on the winch 34 is mounted on the opposite side of the mounting plate 70 from the winch 34. The chain 74 on the driven sprocket 72 is coupled to the drive sprocket 75 which is in turn driven by the second drive coupling 60 and universal joint 66. The drive sprocket 75 is secured to a stub axle constrained by a pair of channel plates 76 and 77 on which are mounted pillow block bearings or flange mount bearings 76a and 77a which constrain forces on the drive sprocket 75 and its stub axle to the radial directions.

The trailed vehicle transmission 58 is provided with at least one drive position and preferably a plurality of drive speeds, and a neutral or idle position for operation of the second power take-off 62. The winch includes a clutch and brake and is selected to provide, for example three operative modes, a winch drive mode for winching in timber on the skidder cable, a locking mode for locking the position of the winch for dragging timber with the trailed skidder vehicle, and a free spool mode for manually pulling the cable from the winch. Such winch operation modes are provided, for example, by the Gearmatic Model 9 (Trademark) winch available from Gearmatic of British Columbia, Canada. The winch 34 and transmission 58 may therefore be coordinated with the first power take-off 52 of the tractor 12 for operation of the winch for cable winching down timber to the trailed skidder vehicle 10, raising the butt ends of the timber on the arch 24, and for skidding and dragging the timber by independent power driven motion of the trailed skidder vehicle 10 as hereafter described.

A third drive coupling 80 is operatively coupled between the trailed skidder vehicle transmission 58 and the differential 22 on axle 18 which supports the trailed skidder vehicle at the location adjacent to the rear end of the frame 14. The third drive coupling 80 is provided by a third drive shaft 82 with universal joints 84 and 85 at either end as shown in FIGS. 5A and 5B.

The first drive shaft 55 of the first drive coupling 50 is constructed with a first slip joint for longitudinal extension and retraction of the first drive shaft 55 thereby avoiding compressional loads and impacts on the first and second universal joints 54 and 56. The first slip joint is formed by a solid material square cross section driving shaft 57 coupled to the first universal joint 54 and a hollow sleeve driven shaft 59a with a square configuration internal cross section complementary to the square cross section of the driving shaft 57. The driving shaft 57 slides longitudinally within and relative to the driven shaft 59a over a range, for example, of 16–18 inches (40.6–5.7 cm). The driven shaft 59a is coupled to the second universal joint 56. Similarly, a slip joint 86 is provided in the third drive coupling means 80 for telescoping extension and retraction of the drive shaft 82 in the longitudinal direction to accommodate slight flexing motion of the elongate frame or chassis 14 and to eliminate compressional forces and impacts on the universal joints 84 and 85.

Figure 3:
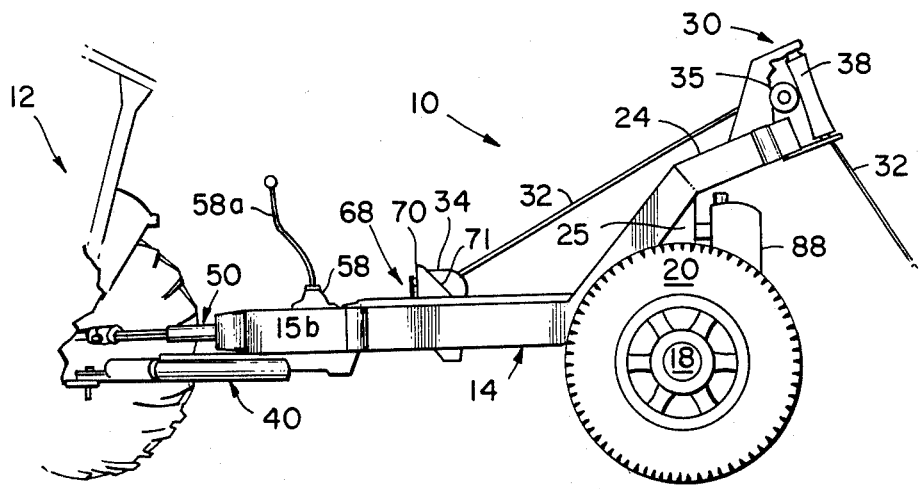
FIG. 3 is a side elevation view of the cable skidding or cable winching trailed skidder vehicle showing the elongate frame and the superstructural arch support and axle at the rear end of the frame.

In the operation of the trailed skidder vehicle 10 as shown in FIGS. 1 and 3 the winch 34 is placed in the free spool mode and the cable 32 is drawn out to the timbers at remote locations for winching in to the vehicle. Shorter lengths of choker cable 90 with choker collars 92 are placed around the individual timbers or groups of timbers. The winch 34 is placed in the winch drive mode and the timbers 94 are drawn in to the trailed skidder vehicle 10.

The arrangement of the arch 24 with the top of the arch and fairlead 30 extending beyond the axle 18 and the rear end of the frame 14 facilitates preventing the butt ends of the timbers 94 from being caught under or abutting against the axle 18. Butt plates 88 are also provided at the rear end of the frame or chassis 14 to protect the vehicle 10 from the butt ends of timbers 94. The butt plates 88 and large tires 20 also shield an operator standing at the side of the frame operating the controls of winch 34 and the gearshift 58a of transmission 58.

When the timbers have been winched to the rear end of the frame, continuing operation of the winch 34 in the winch drive mode can be used to raise the butt ends of the timbers 94 under the top of the overhanging arch 24. The winch is then placed in the winch locking mode. A solo operator can then disengage the first power takeoff of the tractor 12 and shift the trailed power vehicle transmission 58 by means of gearshift 58a to one of the drive positions and then re-engage the tractor power takeoff for independent drive of the wheels of the trailed skidder vehicle 10 for skidding, dragging, and hauling the timbers 94. A typical tractor 12 for operation of the trailed skidder vehicle 10 is, for example, a Ford Model 2110 four-wheel drive, thirty-eight horsepower, tractor. With this arrangement the trailed skidder vehicle 10 is capable of winching, dragging, skidding, and hauling nine to ten full length tree trunks amounting to, for example, one and a half cords of wood up steep grades such as, for example, a 40-45% grade or incline.

With a trailed skidder vehicle length of approximately twelve feet (3.65 m) as described in FIGS. 1-6, with four 11.00-20, 20-inch (40.6 cm) diameter rim, twelve-ply tires and with a two-speed transmission 58, the weight of the trailed skidder vehicle 10 with winch 34 is in the range of 3200-3800 pounds (1454-1727 kg). A double axle may also be used at the rear of the trailed skidder vehicle with double sets of wheels and a Jackshaft or dead axle between the differentials of the two axles.

Figure 7:
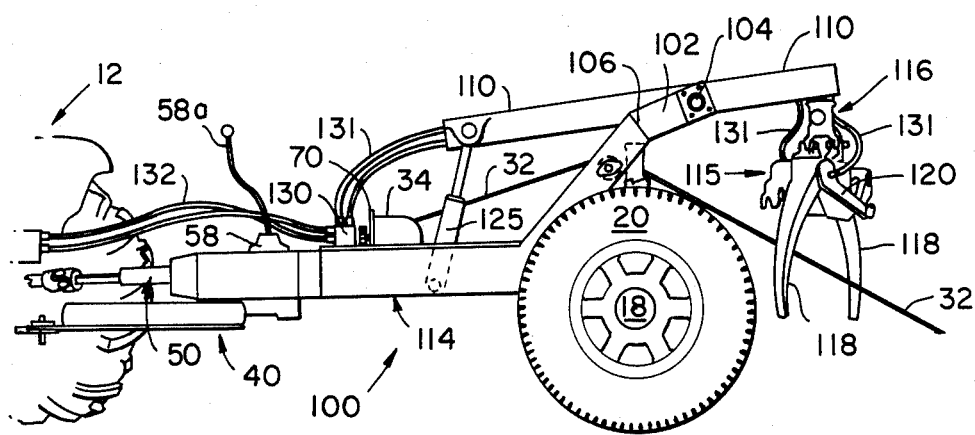
FIG. 7 is a detailed fragmentary side view of an alternative combination embodiment of the invention showing the superstructural arch support fitted with a boom and grapple for grapple skidding operation and with the cable bearing rollers or fairlead mounted lower on the arch support thereby combining grapple skidder capability with cable skidder ability on the trailed or trailing skidder vehicle.
Figure 8:
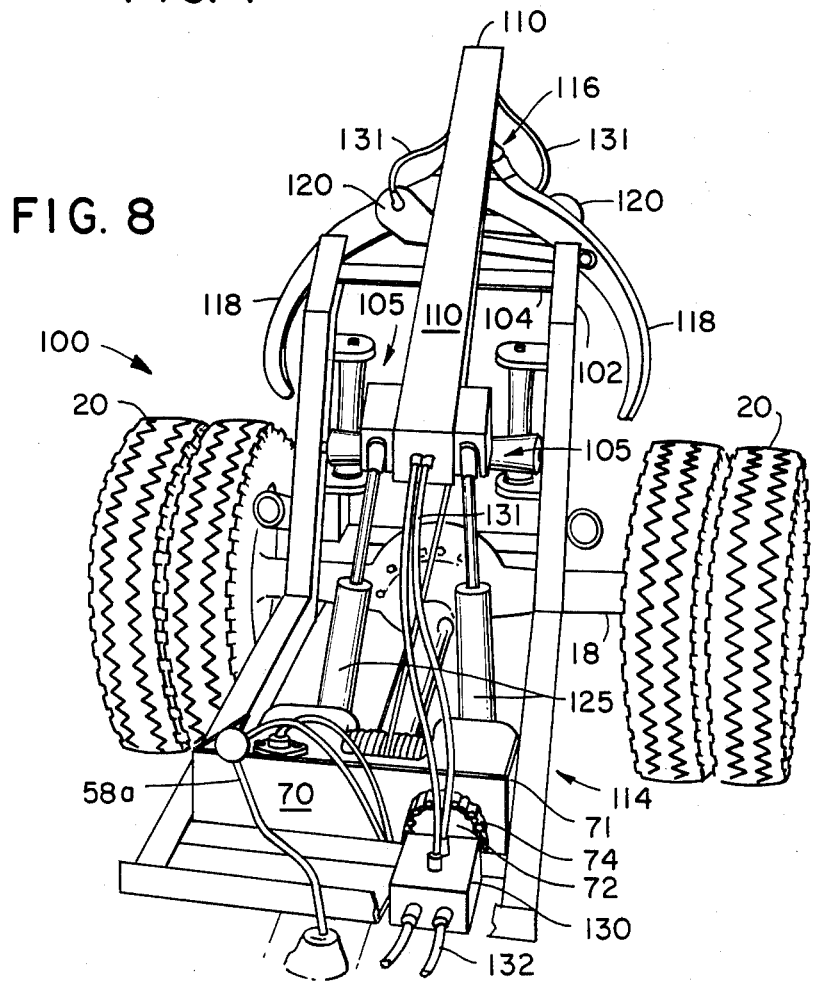
FIG. 8 is a fragmentary perspective view from the rear of the combination embodiment showing the boom and grapple on the arch with cable bearing or fairlead mounted below.
Figure 9:
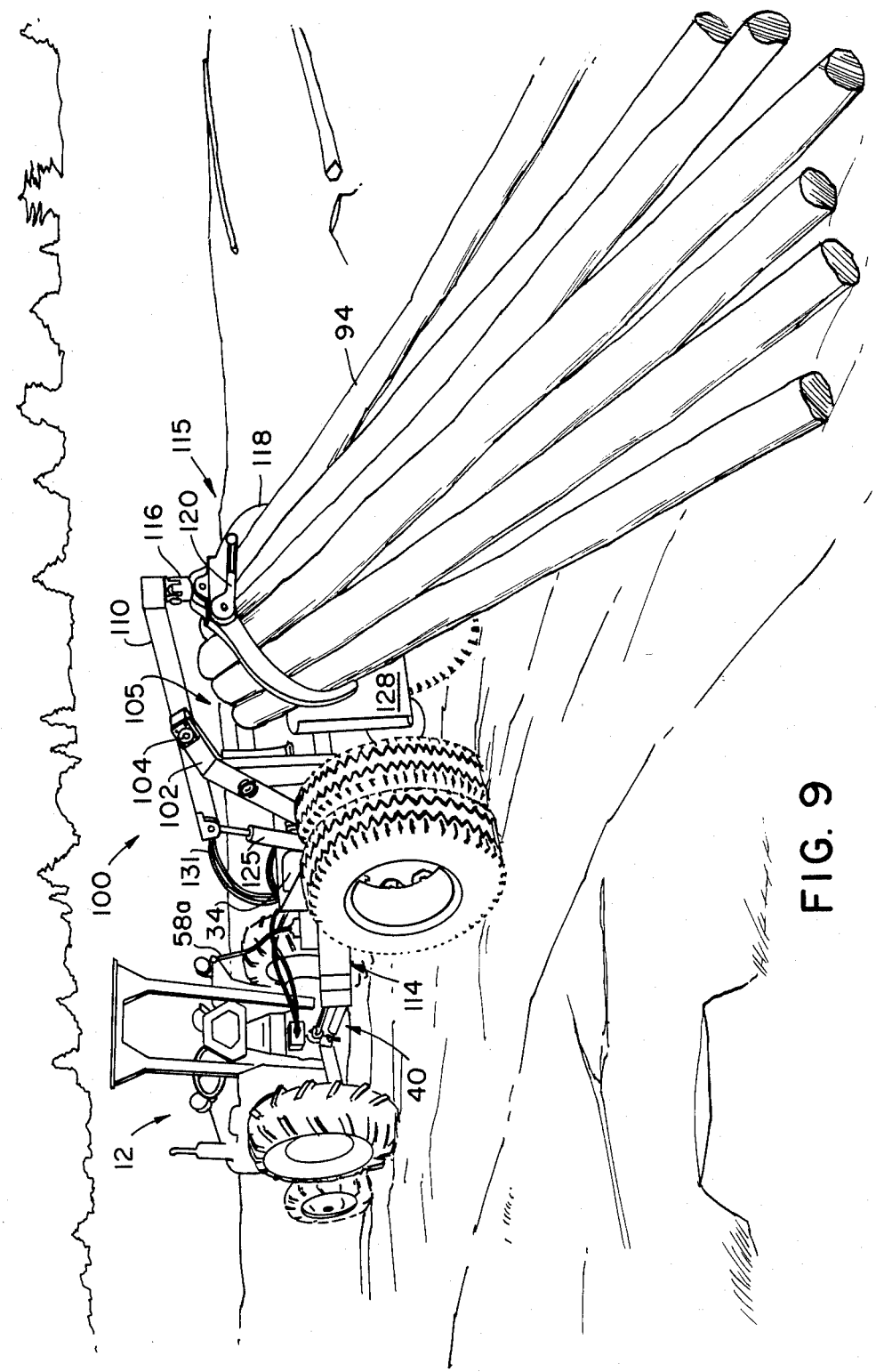
FIG. 9 is a fragmentary perspective view from the front of the combination embodiment showing the location of winch controls for cable skidding operation, the hydraulic controls for grapple skidding operation, and transmission gearshift and power takeoff controls.

An alternative embodiment of the invention for grapple skidding and grapple skidding in combination with cable skidding is illustrated in FIGS. 7-9. The trailed skidder vehicle 100 shown in FIGS. 7-9 is similar in all respects to the trailed skidder vehicle 10 of FIGS. 1-6 except as follows. In the embodiment of FIGS. 7-9 the arch or superstructure arch support 102 is modified to provide a shaft bearing 104 across the top of the modified arch 102. The fairlead 105 consisting of the cable bearing rollers similar to the fairlead 30 of FIGS. 1-6 has been moved to a lower position at the elbow 106 of the arch 102 so that the timber cable 32 passes over the horizontal roller of the fairlead rollers 105 below the shaft bearing 104 and the top of the arch.

According to the invention, an elongate grapple boom 110 is pivotally mounted on the shaft bearing 104 in the direction of the elongate axis of the frame or chassis 114. One portion of the boom 110 extends from the shaft bearing 104 beyond the rear of the trailed skidder vehicle 110. A skidder grapple 115 is mounted on this free end of the boom 110 on a universal grapple mounting swivel coupling 116. The grapple 115 is composed of grapple jaws 118 and hydraulic rams or cylinders 120 which expand and contract the jaws 118 for grapple handling of timbers.

The chassis end of the grapple boom 110 extending in the direction of the chassis or frame 114 from the shaft bearing 104 is movably coupled to the frame by the pair of hydraulic cylinders or rams 125. The grapple boom hydraulic cylinders 125 are substantially vertically oriented and extension and retraction of the hydraulic cylinders 125 produces a seesawing motion of the boom 110 on the shaft bearing 104 for lowering and raising the grapple 115. With the hydraulic cylinders 125 extended the grapple boom 110 lowers the grapple 115 for grabbing timbers. When the hydraulic cylinders 125 are retracted, the grapple boom 110 lifts or raises the butt ends of timbers held in the jaws 118 of the grapple 115.

Hydraulic valve controls 130 are positioned along the side of the frame 114 near the controls for winch 34 and the gearshift 58a for the trailed skidder vehicle transmission 58. By this arrangement, an operator can stand behind the shield provided by the wheels 20 and butt plate 128 for operation of the controls for the grapple hydraulics, winch cable, and trailed skidder vehicle transmission. The butt plate 128, as shown in FIG. 9, has been modified to accommodate the lower position of the fairlead rollers 105. Thus, the butt plate 128 is shorter in length for unobstructed passage of the timber cable over the fairlead roller. The hydraulic motive power for the control valves 130 is derived from the hydraulic system of the tractor 12 along hydraulic lines 132 with appropriate hydraulic lines 131 leading from the control valves 130 to the grapple boom hydraulic cylinders 125 and grapple jaw hydraulic cylinders 120.

In the operation of the trailed skidder vehicle as a grapple skidder, the trailed skidder vehicle 100 is backed into or otherwise driven with the back of the chassis or frame 114 positioned at the butt end or butt ends of timbers to be hauled. By the seesaw motion of the grapple boom 110 the grapple hook 115 with open jaws is dropped over the timbers and the jaws contracted to grab the desired timbers. The grapple hook 115 is then raised by the boom 110, lifting the butt ends of the timber for skidding, dragging, and hauling.

For operation of the trailed skidder vehicle 100 as a combined cable skidder and grapple skidder, the trailed skidder vehicle 100 is first positioned at a selected location for winching timbers into the back of the chassis or frame 114 in the manner described with reference to FIGS. 1-6. With the timbers assembled together below the arch at the rear of the trailed skidder vehicle, the grapple skidding operation replaces the cable skidding operation and the grapple hook is used to raise the butt end of the timbers for hauling in the manner of a grapple skidder. By this co-acting combination of cable skidding and grapple skidding, the timbers can first be assembled by winching in from difficult, inaccessible, or rough terrain to the twitching site of the trailed skidder vehicle which then operates as a grapple skidder for hauling and dragging using the grapple and the independent power drive of the wheels of the trailed vehicle. By placement of the cable bearing rollers or fairlead at a location on the arch below the grapple boom, the cable can operate without interference through the open jaws of the grapple and the grapple can operate using the seesaw motion of the grapple boom 110 without interference from cable bearing elements above. The unique interactive combination of the cable and grapple skidder elements permits flexible timber skidding woods work in a manner heretofore unavailable from conventional skidders with equipment of much lighter weight and lower cost.

While the invention is described with reference to particular example embodiments, it is intended to cover all modifications and equivalents within the scope of the following claims.

I claim:
1. A wood skidder machine for skidding, dragging, or towing down timber from the woods comprising;
a trailed skidder vehicle constructed without its own power drive source for operation and use with a separate power driving vehicle, said trailed skidder vehicle comprising an elongate structural frame having a forward end and a rear end;
axle means supporting the frame at a location adjacent to the rear end of the frame, said axle means comprising a set of wheels distributed on either side of the frame for transport of the frame over the ground surface, said axle means further comprising differential means for coordinated drive of the set of wheels;

a load bearing superstructure extending above the frame adjacent to the rear end of the frame, said superstructure being constructed and arranged with braces on the frame for transmitting forces from a load applied on the superstructure to the axle means, said superstructure comprising superstructure cable bearing means arranged on the superstructure;

a winch mounted on the frame, for extending and retracting a timer skidding cable over the superstructure cable bearing means;

trail hitch means formed at the front end of the frame for coupling to the power driving vehicle;

first drive coupling means formed at the front end of the frame for coupling to a first power take-off of the power driving vehicle, said first drive coupling means comprising a first universal joint, first drive shaft and second universal joint in sequence;

trailed skidder vehicle transmission means mounted on the frame, said first drive coupling means being operatively coupled to said transmission means through bearing means, said transmission means comprising at least one drive position, one neutral or idle position and a second power take-off;

second drive coupling means operatively coupled between the second power take-off of the transmission means and the winch;

and third drive coupling means operatively coupled between the transmission means and the differential means of the axle means for independent drive of the axle means and set of wheels;

and, a self supporting independently operable farm tractor power driving vehicle having a four point stable where base, said farm tractor power driving vehicle comprising a trailer hitch coupling and a first power take-off for coupling to the trailed skidder vehicle;

whereby the trailed skidder vehicle wheels are power driven by said farm tractor power driving vehicle for independent traction and drive by the trailed skidder vehicle, whereby the winch is power driven by said farm tractor power driving vehicle for cable skidding, pulling, or dragging down timber, and whereby the timber butt ends may be lifted above the ground from the superstructure for skidding, towing, or hauling down timber and for bearing the load on the trailed skidder vehicle rather than the farm tractor power driving vehicle.

2. The wood skidder machine of claim 1 wherein the superstructure comprises a superstructure arch that extends beyond the axle means in the direction of the rear end of the frame and wherein the cable bearing means is mounted on the superstructure arch beyond the axle means in the direction of the rear end of the frame to prevent butt ends of lengths of down timber skidded or dragged in by the winch on a timber skidding cable from abutting against the axle means.

3. The wood skidder machine of claim 2 further comprising substantially vertical butt plate means secured at the rear end of the frame to stop the butt ends of timber skidded or dragged in by the winch.

4. The wood skidder machine of claim 2 wherein the cable bearing means comprises at least one cable bearing roller including a first horizontal cable bearing roller mounted adjacent to the top of the superstructure and first and second vertically oriented cable bearing rollers mounted on either side of the horizontal roller.

5. The wood skidder machine of claim 1 wherein the first drive shaft of the first drive coupling means comprises a first slip joint for longitudinal extension and retraction of the first drive shaft thereby avoiding compressional loads and impacts on the first and second universal joints during relative motion of a power driving vehicle and the trailed skidder vehicle.

6. The wood skidder machine of claim 5 wherein the trail hitch means comprises a roll over or coupling around a longitudinal axis along the elongate direction of the frame for accommodating rotational or twisting motion of the trailed skidder vehicle relative to a power driving vehicle.

7. The wood skidder machine of claim 5 wherein the third drive coupling means comprises a third universal joint, second drive shaft and fourth universal joint in sequence, and wherein said second drive shaft comprises a second slip joint for telescoping extension and retraction of the second drive shaft in the longitudinal direction to accommodate slight flexing motion of the elongate frame and to eliminate compression forces and impacts on the third and fourth universal joints.

8. The wood skidder machine of claim 7 wherein the roll over or rotating coupling of the trailer hitch comprises a circular cross section trailer hitch bar for coupling to the power driving vehicle and a circular cross section sleeve coaxial with the circular cross section trail hitch bar, said circular cross section sleeve being secured to the frame.

9. The wood skidder machine of claim 5 wherein the first slip joint comprises a solid material square cross section driving shaft coupled to the first universal joint and a hollow sleeve driven shaft with square configuration internal cross section complementary to the square cross section of the driving shaft, said driven shaft being coupled to the second universal joint.

10. The wood skidder machine of claim 9 wherein the first drive coupling means passes through the frame to the transmission means and further comprising a flange mount bearing mounted on the frame adjacent to the transmission means for maintaining and directing forces radially on the first drive coupling means.

11. The wood skidder machine of claim 1 wherein the winch comprises a clutch and brake for three operative modes of the winch, a winch drive mode for winching in a timber skidder cable, a locking mode for locking the position of the winch, and a free spool mode for manually pulling the cable from the winch, wherein the trailed skidder vehicle transmission means comprises at least one drive speed for independent power drive of the axle means differential and set of wheels of the trailed skidder vehicle and a neutral or idle mode for operation of the transmission means second power take off, said winch being operatively coupled to the second power take off whereby the winch and transmission means may be coordinated with a first power take off of a power driving vehicle for operation of the winch for skidding and dragging down timber when the trailed skidder vehicle transmission is in neutral or idle and for driving the trailed skidder vehicle axle means and set of wheels with a power driving vehicle when the trailed skidder vehicle transmission means is in a forward drive speed and the winch is in the locking mode.

12. The wood skidder machine of claim 1 wherein said axle means comprises dual axles supporting the frame near the rear end of the frame including a first axle comprising a first set of wheels and a second axle comprising a second set of wheels, wherein said differential means comprises first differential gears for coordinated drive of the first set of wheels and second differential gears for coordinated drive of the second set of wheels, wherein said third drive coupling means is operatively coupled between the trailed skidder vehicle transmission means and the first differential of the first axle and further comprising a jackshaft operatively coupled between the first and second differential gears of the first and second axles.

13. The wood skidder machine of claim 1 further comprising:

said superstructure comprising a superstructure arch defining a pivot axis elongate boom means mounted on the superstructure arch with first and second ends extending beyond either side of the superstructure arch pivot axis for pivotal seesaw motion of the first and second ends of the boom upward and downward around the superstructure arch, said boom means being mounted above the superstructure cable bearing means and oriented with the first end comprising a lever arm extending toward the forward end of the frame and coupled to boom drive coupling means for powering the seesaw pivotal motion of the boom and with the second end comprising the free end of the boom means extending in the direction of the rear end of the frame;

grapple means mounted at the free end of the boom means for grapple skidding down timber, thereby combining grapple skidder ability with cable skidder ability on the trailer skidder vehicle;

and boom drive coupling means mounted on the frame and operatively coupled to the first end of the boom means and grapple drive coupling means mounted on the grapple means for grapple skidding operation.

14. The wood skidder machine of claim 13 wherein the boom drive coupling means and grapple drive coupling means comprise hydraulic rams operatively coupling the first end of the boom means to the frame and operatively coupled on the grapple means, and hydraulic coupling means for driving the hydraulic rams.

15. A wood skidder machine for skidding, dragging, or towing down timber from the woods comprising:

a trailed skidder vehicle constructed without its own power drive source for operation and use with a separate power driving vehicle, said trailed skidder vehicle comprising an elongate structural frame defining a front end constructed and arranged for coupling to a power driving vehicle and a rear end constructed and arranged for skidding down timber; location axle means supporting the frame at a location adjacent to the rear end of the frame, said axle means comprising a set of wheels distributed on either side of the frame for transport of the frame over the surface of the ground, said axle means further comprising differential means for coordinated drive of the set of wheels;

a load bearing arch support extending above the frame adjacent to the rear end of the frame, said arch support being constructed and arranged with braces on the frame for transmitting forces from a load applied on the arch support to the axle means, said arch support comprising arch cable bearing means on the arch support, said arch support being constructed and arranged with the arch support extending and the arch cable bearing means positioned behind or beyond a vertical plane through the axle means in the direction of the rear end of the frame;

butt plate means mounted and secured at the back of the frame to protect the axle and rear end of the frame from the butt ends of timber skidded or dragged in to the trailed skidder vehicle;

a winch mounted on the frame adjacent to the load bearing arch support, said winch comprising means for extending and retracting a timber skidding cable over the arch cable bearing means;

trail hitch means at the front of the frame for coupling to the power driving vehicle said trail hitch comprising a roll over or rotational coupling constructed and arranged for rotation around a longitudinal axis along the elongate direction of the frame to accommodate relative rolling or twisting motion between the trailed skidder vehicle and the power driving vehicle;

first drive coupling means mounted at the front of the frame substantially in parallel with the trail hitch means for coupling to a first power take off of the power driving vehicle, said first drive coupling means comprising a first universal joint, first drive shaft and second universal joint in sequence, said first drive shaft comprising a slip joint for telescoping longitudinal extension and retraction of the drive shaft to eliminate compression loads on the first and second universal joints whereby said trailer hitch means and first drive coupling means accommodate flexing, rolling and extension and retraction relative motion between the trailed skidder vehicle and the power driving vehicle to which it is coupled;

transmission means mounted on the frame, said first drive coupling means being operatively coupled to the transmission means, said transmission means comprising at least one drive position and a neutral or idle position and a second power take off for driving the winch, said first drive shaft of the first drive coupling means passing through the frame and being mounted on the frame adjacent to the transmission by a flange mount bearing for constraining the forces on the first drive shaft to radially directed forces;

second drive coupling means operatively coupled between the transmission means second power take off and the winch;

third drive coupling means operatively coupled between the transmission means and the differential means of the axle means, said third drive coupling means comprising a third universal joint, second drive shaft and fourth universal joint in sequence said second drive shaft comprising a slip joint to accommodate flexing motion of the elongate structural frame for eliminating compression loads and impacts on the third and fourth universal joints;

and, a self supporting independently operable farm tractor power driving vehicle having a four point stable wheel base, said farm tractor power driving vehicle comprising a trailer hitch coupling and a first power take-off for coupling to the trailed skidder vehicle;

whereby the trailed skidder vehicle wheels are power driven by the farm tractor power driving vehicle via the trailed skidder vehicle transmission means for independent drive and traction, whereby the winch is power driven by the farm tractor power driving vehicle via the trailed skidder vehicle transmission means for skidding or dragging down timber, whereby timber butt ends are winched up above the ground on the arch support for dragging, towing, or pulling timber and whereby the skidded, dragged, or towed load is borne by the trailed skidder vehicle rather than the farm tractor power driving vehicle.

16. The wood skidder machine of claim 15 further comprising:

said superstructure arch support defining an elevated horizontal pivot axis;

elongate boom means mounted on the superstructure arch support with first and second ends extending beyond either side of the superstructure arch support pivot axis for pivotal motion of the first and second ends of the boom upward and downward around the arch support, said boom means being mounted above the arch cable bearing means and oriented with the first end comprising a lever arm extending toward the forward end of the frame and coupled to boom drive coupling means for powering the seesaw pivotal motion of the boom and with the second end comprising the free end of the boom means extending in the direction of the rear end of the frame;

grapple means mounted at the free end of the boom means for grapple skidding down timber, thereby combining grapple skidder ability with cable skidder, ability on the trailed skidder vehicle;

and boom drive coupling means mounted on the frame and operatively coupled to the first end of the boom means and grapple drive coupling means mounted on the grapple means for grapple skidding operation.

17. The wood skidder machine of claim 16 wherein the boom drive coupling means and grapple drive coupling means comprise hydraulic rams operatively coupling the first end of the boom means to the frame and operatively coupled on the grapple means, and hydraulic coupling means for driving the hydraulic rams.

18. A wood skidder machine for skidding, dragging, or towing down timber from the woods comprising:

a trailed skidder vehicle constructed without its own power drive source for operation and use with a separate power driving vehicle, said trailed skidder vehicle comprising an elongate structural frame having a forward end and a rear end;

axle means supporting the frame at a location adjacent to the rear end of the frame, said axle means comprising a set of wheels distributed on either side of the frame for transport of the frame over the ground surface, said axle means further comprising differential means for coordinated drive of the set of wheels;

a load bearing superstructure arch extending above the frame adjacent to the rear end of the frame and defining a horizontal superstructure arch pivot axis, said superstructure arch being constructed and arranged with braces on the frame for transmitting forces from a load applied on the superstructure arch to the axle means, said superstructure arch comprising elongate boom means mounted on the superstructure arch with first and second ends extending beyond either side of the superstructure arch pivot axis for seesaw pivotal motion of the first and second ends of the boom upward and downward around the superstructure, said boom means being oriented with the first end comprising a lever arm extending toward the forward end of the frame and coupled to boom drive coupling means for powering the seesaw pivotal motion of the boom and with the second end comprising the free end of the boom means extending in the direction of the rear end of the frame;

grapple means mounted at the free end of the boom means for grapple skidding down timber;

trail hitch means formed at the front end of the frame for coupling to the power driving vehicle;

first drive coupling means formed at the front end of the frame for coupling to the first power take-off of the power driving vehicle, said first drive coupling means comprising a first universal joint, first drive shaft and second universal joint in sequence;

trailed skidder vehicle transmission means mounted on the frame, said first drive coupling means being operatively coupled through bearing means to said transmission means;

hydraulic drive coupling means mounted on the frame and operatively coupled to the boom means and grapple means for hydraulically driven grapple skidding operation, said hydraulic drive coupling means comprising hydraulic rams, and hydraulic valve means for controlling operation of the boom means and grapple means, said hydraulic drive coupling means being constructed and arranged for coupling to an auxiliary hydraulic system;

second drive coupling means operatively coupled between the transmission means and the differential means of the axle means for independent drive of the axle means and set of wheels;

and, a self supporting independently operable farm tractor power driving vehicle having a four point stable wheel base said farm tractor power driving vehicle comprising a trailer hitch coupling and a first power take-off for coupling to the trailed skidder vehicle;

whereby the trailed skidder vehicle wheels are power driven by the farm tractor power driving vehicle for independent traction and drive by the trailed skidder vehicle, whereby the boom means and grapple means are power driven by the farm tractor power driving vehicle for grapple skidding, hauling, or dragging down timber, and whereby the timber butt ends are grappled above the ground from the superstructure for grapple skidding, towing, or pulling down timber and for bearing the load on the trailed skidder vehicle rather that the farm tractor power driving vehicle.

* * * * *